(12) United States Patent
Nishio et al.

(10) Patent No.: US 7,035,109 B2
(45) Date of Patent: Apr. 25, 2006

(54) RECORDING MEDIA UNIT

(75) Inventors: Atsushi Nishio, Mito (JP); Takashi Kawasaki, Mito (JP); Kazuhiro Okazaki, Mito (JP); Satoru Karahashi, Mito (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 184 days.

(21) Appl. No.: 10/307,774

(22) Filed: Dec. 2, 2002

(65) Prior Publication Data

US 2003/0107972 A1 Jun. 12, 2003

(30) Foreign Application Priority Data

Dec. 6, 2001 (JP) .......................................... 2001-37262

(51) Int. Cl.
*G06F 1/16* (2006.01)

(52) U.S. Cl. ..................... 361/724; 361/727; 312/223.2; 710/101

(58) Field of Classification Search ......... 361/724–727, 361/679–687; 312/223.1–223.6; 165/80.3, 165/121–126; 710/2, 62, 101

See application file for complete search history.

(56) References Cited

U.S. PATENT DOCUMENTS

| 3,936,011 | A | * | 2/1976 | Staar | 242/338.4 |
| 4,716,477 | A | * | 12/1987 | Uehara | 360/99.07 |
| 5,598,319 | A | * | 1/1997 | Lee | 361/684 |
| 6,282,086 | B1 | * | 8/2001 | Loh et al. | 361/684 |
| 6,285,555 | B1 | * | 9/2001 | O'Neal et al. | 361/727 |

FOREIGN PATENT DOCUMENTS

| JP | 08-180544 | 7/1996 |
| JP | 04-259951 | 9/1996 |

* cited by examiner

*Primary Examiner*—Hung Van Duong
(74) *Attorney, Agent, or Firm*—Ladas & Parry LLP

(57) ABSTRACT

A recording media unit is provided that includes a slot through which a recording media is inserted into and ejected out of the recording media unit, a recording media holder, movably attached inside the recording media unit, for supporting a recording media, and a recording media holding mechanism, connected to the recording media holder, having a spring member. The recording media holder that supports the recording media that has been moved to an intermediate position along a direction in which the recording media is inserted is moved by a spring force of the spring member to a position where the recording media is pulled inside the recording media unit or to a position where the recording media protrudes from the slot.

8 Claims, 10 Drawing Sheets

RECORDING MEDIA UNIT

BACKGROUND OF THE INVENTION

1. Field of the Invention

The present invention relates to a recording media unit and more particularly to a recording media unit in which a recording media is loaded by being entirely accommodated therein.

2. Description of the Related Art

A recording media is configured to include a solid-state element or a magnetic recording medium for recording information therein and may also include an information read/write device such as a magnetic head device. A recording media unit is configured such that a recording media can be loaded and ejected and is also capable of reading and writing information by accessing the recording media loaded therein.

The recording media unit may be of a type in which the entire recording media except for the rear end part is inserted inside the recording media unit and of a type in which the entire recording media is accommodated inside the recording media unit.

The recording media unit of the type in which the entire recording media is accommodated inside the recording media unit is configured such that a recording media holder pulls in the recording media that has been inserted to an intermediate position through a slot and also, by an ejection operation, ejects the recording media outside the recording media unit.

Conventionally, a mechanism for moving the recording media holder that supports the recording media upon loading and ejecting is provided with a motor as a power source and uses gears and racks.

Accordingly, since the recording media holder moving mechanism occupies a large space, it was difficult to apply such a recording media holder moving unit to a compact recording media unit.

Also, the recording media holder moving mechanism has drawbacks that a large number of components are required and that the manufacturing cost becomes high due to expensive components such as motors.

SUMMARY OF THE INVENTION

Accordingly, it is a general object of the present invention to provide a recording media unit that can obviate the drawbacks described above.

It is another and more specific object of the present invention to provide a recording media unit in which the recording media can be moved with a simple structure through a greater distance by a less amount of operation as compared to the motor-driven recording media unit of the related art.

According to the present invention, a recording media unit is provided that includes a slot through which a recording media is inserted into and accommodated inside the recording media unit, a recording media holder, movably attached inside the recording media unit, for supporting a recording media, and a recording media moving mechanism, connected to the recording media holder, having a spring member; wherein the recording media holder that supports the recording media that has been inserted through the slot and has been moved to an intermediate position along a direction in which the recording media is inserted, is moved by a spring force of the spring member to a position where the recording media is pulled inside the recording media unit.

According to the present invention, a recording media unit is provided that includes a slot through which a recording media that is accommodated inside the recording media unit is ejected out of the recording media unit by an ejection operation, a recording media holder, movably attached inside the recording media unit, for supporting a recording media, and a recording media holding mechanism, connected to the recording media holder, having a spring member; wherein the recording media holder that supports the recording media and has been moved to an intermediate position along a direction in which the recording media is inserted, is moved by a spring force of the spring member to a position where the recording media protrudes from the slot.

Therefore, according to the present invention, the recording media can be moved with a simple structure through a greater distance by a less amount of operation as compared to the motor-driven recording media unit of the related art. Further, since a shorter push-in stroke of the ejection button is achieved, operability of the recording media unit is improved.

DETAILED DESCRIPTION OF THE PREFERRED EMBODIMENTS

Figure 1:
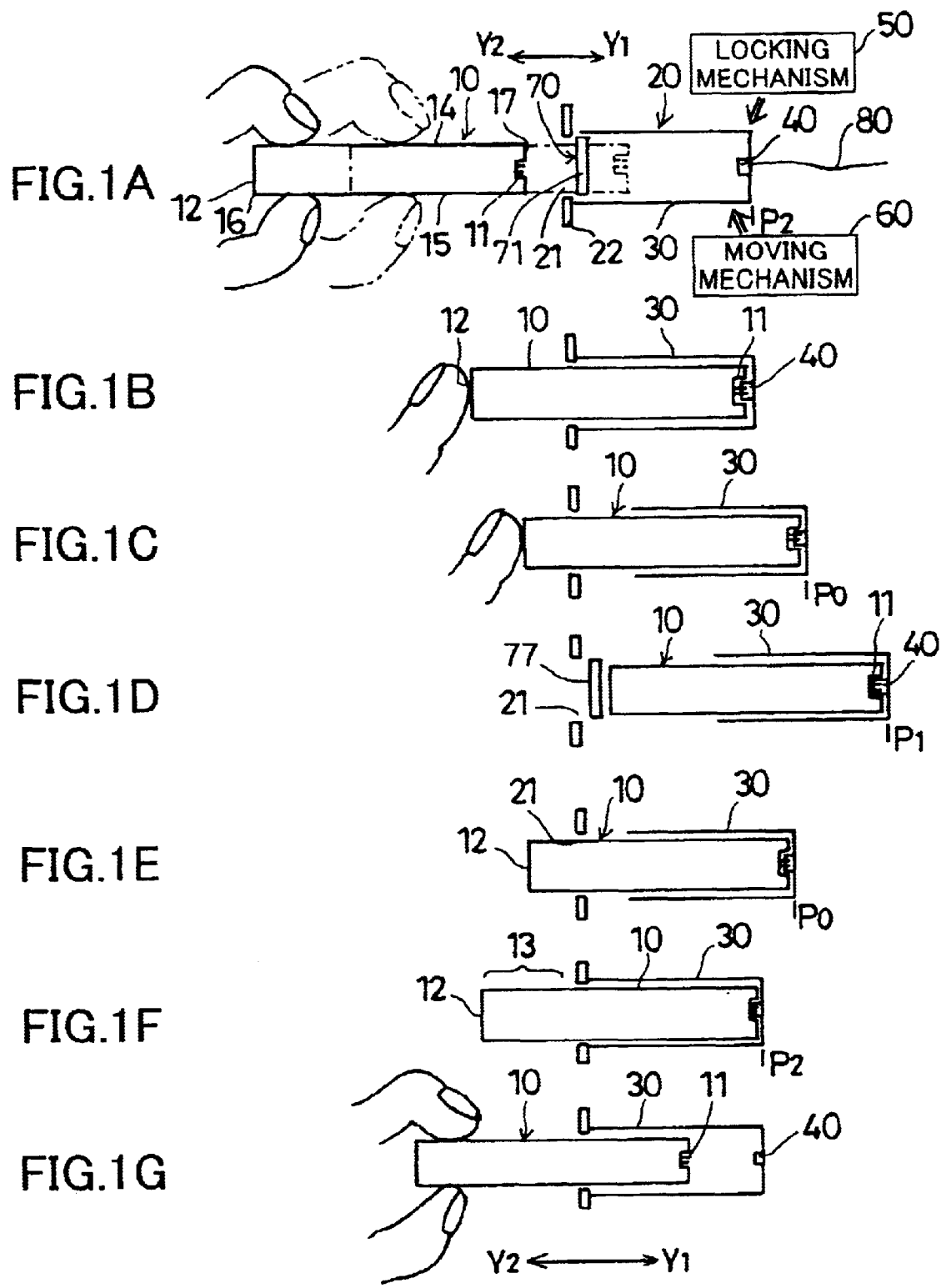
FIGS. 1A through 1G are schematic diagrams showing a recording media unit of an embodiment according to the present invention.

In the following, principles and embodiments of the present invention will be described with reference to the accompanying drawings.

First, for the sake of convenience, a recording media unit 20 of an embodiment of the present invention will be described in general with reference to FIGS. 1A through 1G. In the figures, Y1 indicates a direction along which a recording media 10 is inserted and Y2 indicates a direction along which the recording media 10 is ejected. When in use, the recording media unit 20 is incorporated into electronic appliances such as a digital camera or a computer. The recording media 10 has a substantially rectangular box shape and is provided with a connector 11 on the leading edge towards the direction of insertion. A storage element such as a solid-state element or a magnetic disk and a magnetic head may be provided inside the recording media 10.

The recording media unit 20 includes a front bezel 22 provided with a slot 21 via which the recording media 20 is inserted and ejected, a recording media holder 30 having a box shape for holding the inserted recording media 10 and being movable along the Y1–Y2 direction, a connector 40 provided on the inner wall at the Y1-end of the recording media holder 30 whereto the connector 11 is to be connected, a recording media holder locking mechanism 50, a recording media holder moving mechanism 60 and a shutter mechanism 70. The shutter mechanism 70 includes a first shutter 71 and a second shutter 75. The second shutter 75 may include a shutter main body 77. A flexible flat cable 80 is connected to the Y1-end of the connector 40.

The recording media holder locking mechanism 50 is configured to lock the recording media holder 30 such that it does not move in the Y1-direction and to unlock the recording media holder 30 when the recording media 10 has been inserted into the recording media holder 30 to a position where the connector 11 is connected to the connector 40. The recording media holder moving mechanism 60 moves the recording media holder 30 that has moved in the Y1-direction to a position beyond position P0 to position P1 and moves recording media holder 30 that has moved in the Y2-direction to a position beyond position P0 to position P2. The first shutter 71 closes the slot 21 when the recording media 10 is not accommodated in the recording media unit 20. The shutter main body 77 of the second shutter 75 closes the slot 21 when the recording media 10 is accommodated in the recording media unit 20.

In a state before accommodating the recording media 10, the recording media unit 20 is in a state shown in FIG. 1A. The recording media holder 30 is situated at position P2 and is locked by the locking mechanism 50. The first shutter 71 is closing the slot 21.

As can be seen in FIG. 1A, the operator holds the recording media 10 by hand, such that connector 11 is on the Y1 side, and inserts the recording media 10 through the slot 21 such that it pushes and opens the first shutter 71 and is inserted into the recording media unit 20. As can be seen in FIG. 1B, the operator pushes the end surface 12 of the recording media 10 with a finger and forces the recording media 10 into the slot 21.

With such an operation, first, as shown in FIG. 1B, the connector 11 is connected to the connector 40 which is the counterpart of the connector 11. Then, the locking mechanism 50 is unlocked. The recording media 10 pushes the recording media holder 30 and the connector and is further inserted into the recording media unit 20. Accordingly, the recording media holder 30 and the connector 40 are moved in the Y1-direction.

When the recording media holder 30 passes position P0 as shown in FIG. 1C, the holder moving mechanism 60 further moves the recording media holder 30 in the Y1-direction to position P1 shown in FIG. 1D. Since the connector 11 is connected to the connector 40, the recording media 10 moves together with the recording media holder 30 in the Y1-direction and is pulled into the recording media unit 20 such that it is entirely accommodated and is hidden in the recording media unit 20. Also, the shutter main body 77 of the second shutter 75 closes the slot 21.

This is a state where the recording media 10 is loaded in the recording media unit 20 and, in this state, information may be written on the recording media 10.

In order to eject the recording media 10, for example after completion of an information writing operation, the operator carries out an eject operation by pressing an ejection button. As a result of the ejection operation, as can be seen in FIG. 1E, the recording media holder 30 moves in the Y2-direction and the second shutter 75 is pressed and opened by the recording media 10. Then, the rear surface 12 of the recording media 10 protrudes out of the slot 21. When the recording media holder 30 passes position P0, the recording media holder moving mechanism 60 further moves the recording media 30 in the Y2-direction to position P2 shown in FIG. 1F.

In this state, as can be seen in FIG. 1G, the operator holds a protruded part 13 of the recording media 10 that protrudes out of the slot 21 and pulls it strongly in the Y2-direction. Accordingly, the connector 11 is disconnected from the connector 40 and the recording media 10 is removed from the recording media unit 20. After removal of the recording media 10 from the recording media unit 20, the first shutter 71 closes the slot 21 as shown in FIG. 1A.

Now, the recording media unit 20 of an embodiment of the present invention will be described in detail. The operation of the recording media unit 20 will be described by referring again to FIGS. 1A through 1F.

Figure 2:
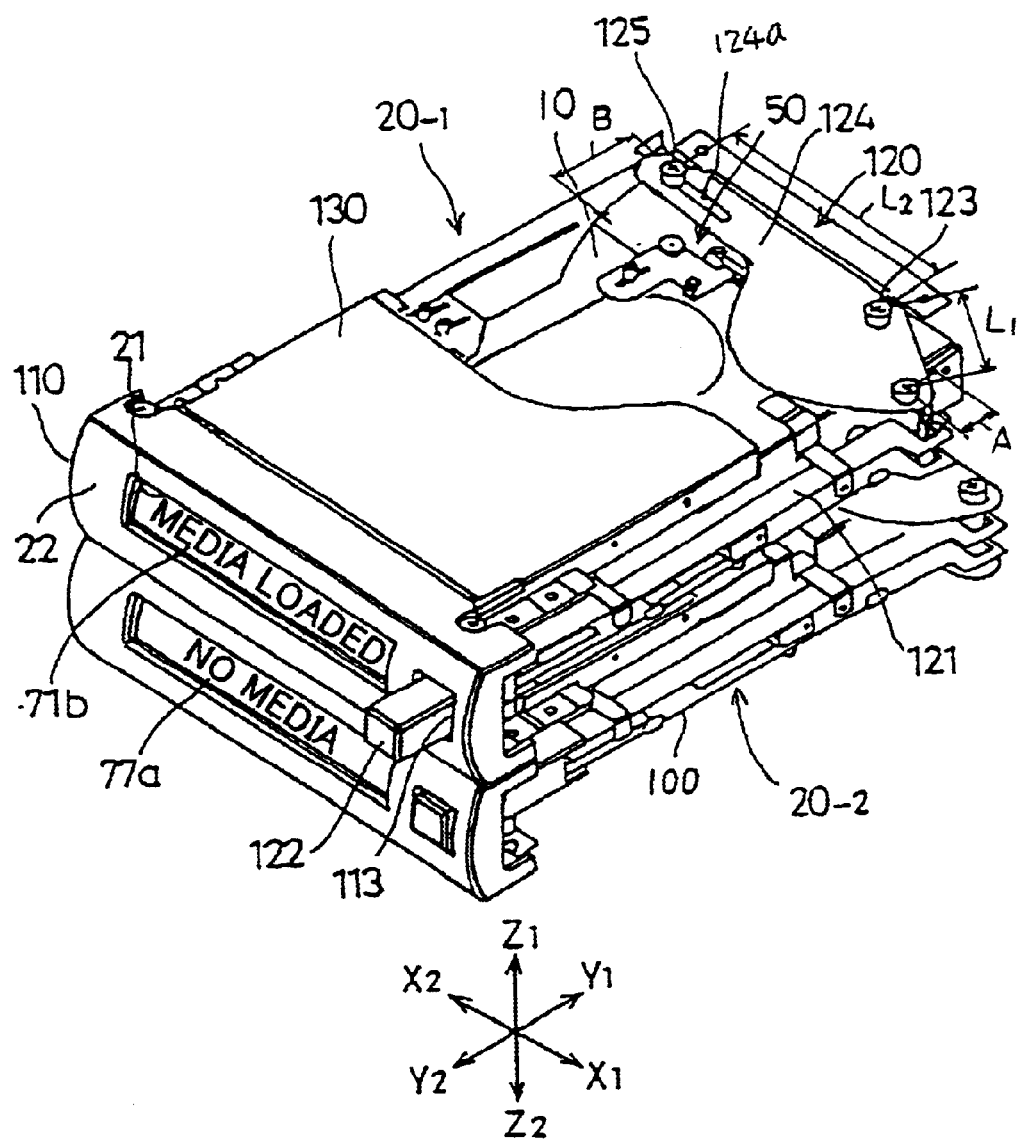
FIG. 2 is a perspective diagram of the recording media units of the embodiment of the present invention that are combined in a stacked manner, viewed from an upper point of a front bezel side.
Figure 3:
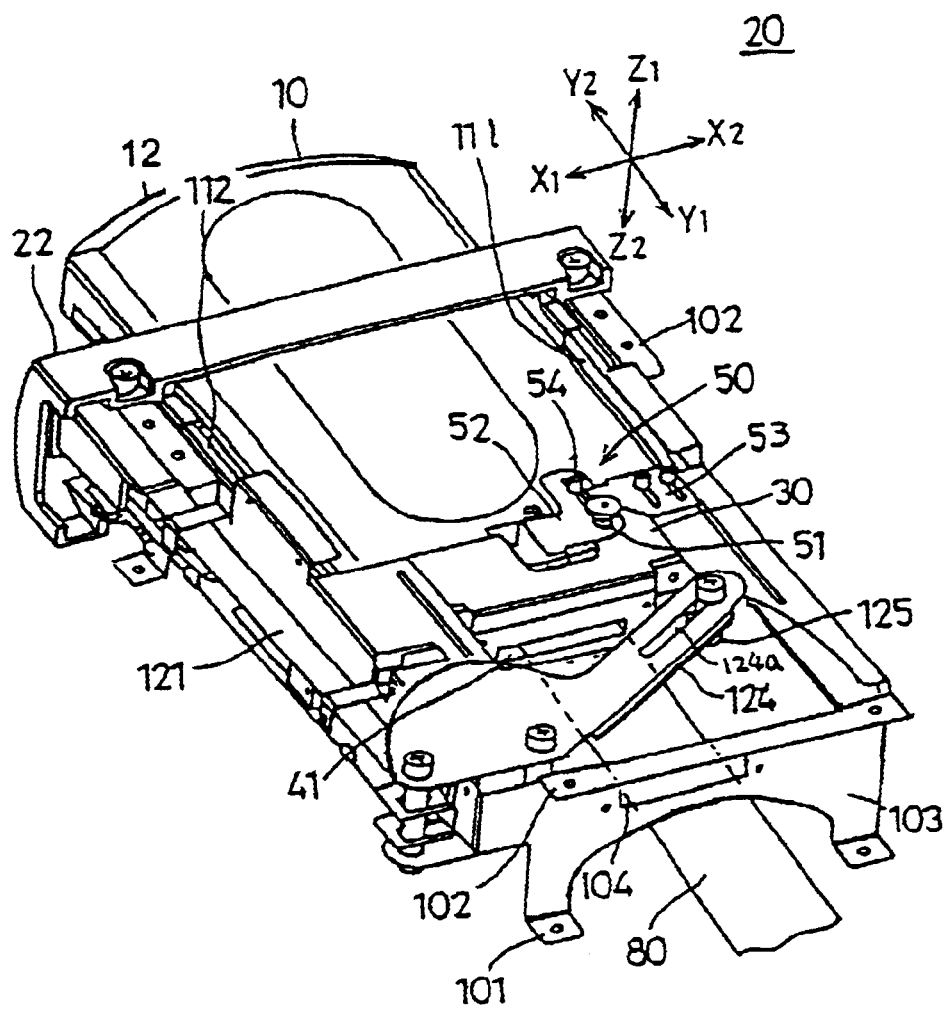
FIG. 3 is a perspective diagram of the recording media unit of the present invention viewed from an upper point of a back surface side.
Figure 4:
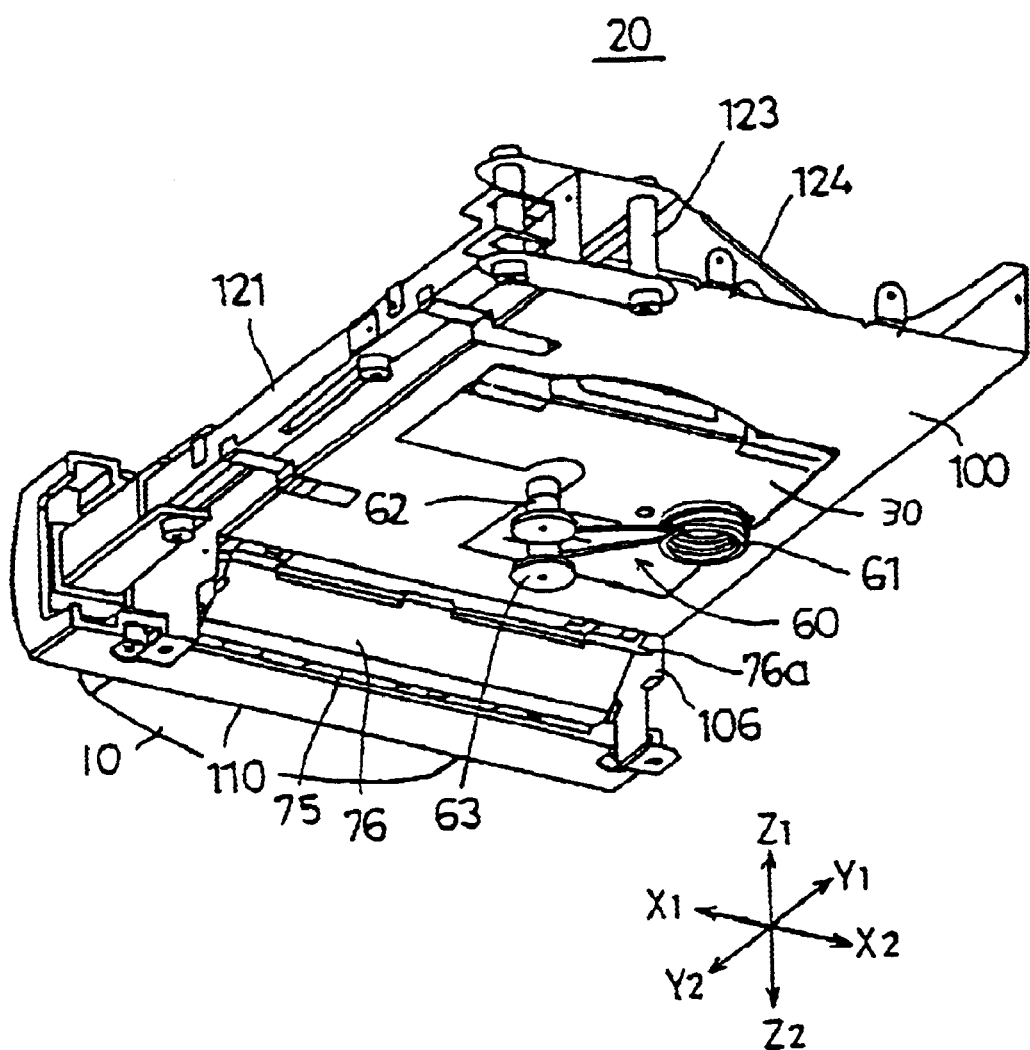
FIG. 4 is a perspective diagram of the recording media unit of the present invention viewed from a lower point of a back surface side.
Figure 5A:
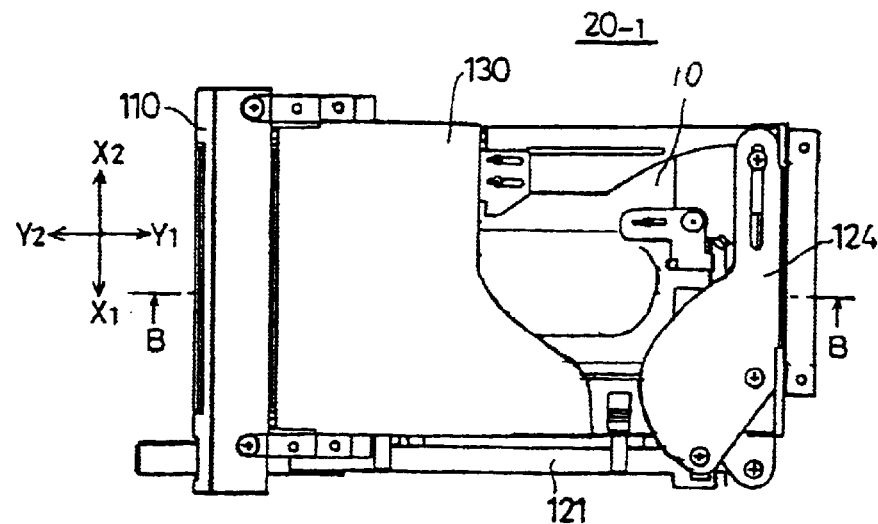
FIGS. 5A through 5C are a plan view, a cross-sectional view along line B—B of FIG. 5A and a bottom view, respectively, of the recording media unit of the present invention.
Figure 5B:
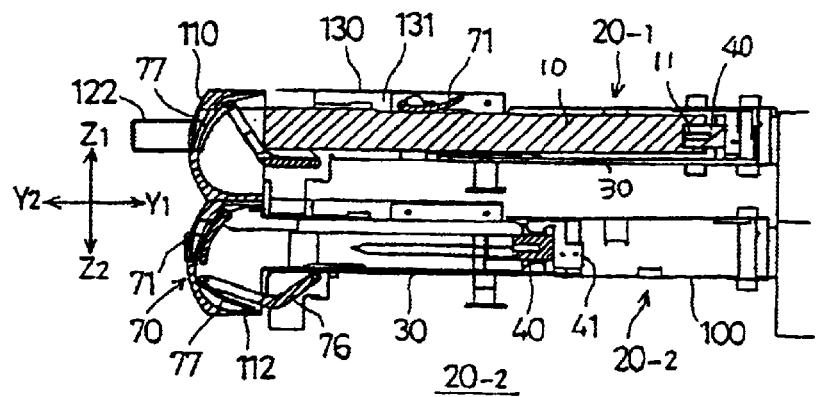
Figure 5C:
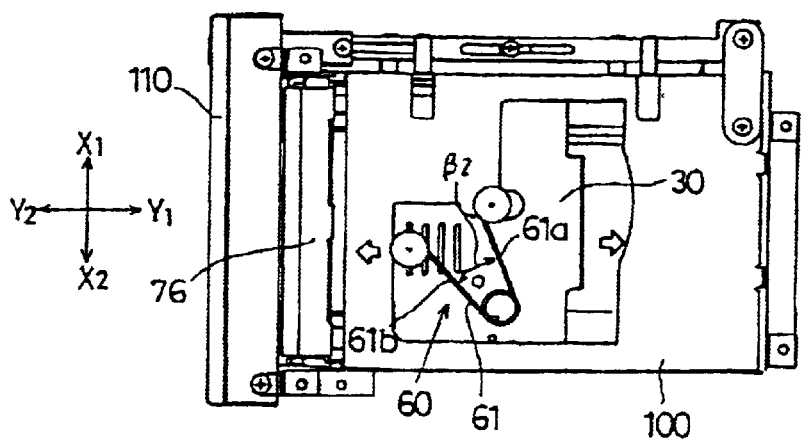

FIG. 2 is a perspective diagram of the recording media units 20 that are coupled in a stacked manner, viewed from an upper viewpoint from the front bezel side. FIG. 3 is a perspective diagram of the recording media unit 20 viewed from an upper viewpoint from the backside. FIG. 4 is a perspective diagram of the recording media unit 20 viewed from a lower viewpoint from the backside. FIGS. 5A through 5C are a plan view, a cross-sectional view along line B—B of FIG. 5A and a bottom view, respectively, of the recording media unit of the present invention. In the figures, X1–X2 indicates a width-wise direction, Y1–Y2 indicates a depth-wise direction and Z1–Z2 indicates a height-wise direction. In each figure, those components corresponding to the components shown in FIGS. 1A through 1G are indicated with same reference numerals.

FIG. 2 shows a state where the recording media units 20-1 and 20-2 are stacked and coupled. The upper recording media unit 20-1 is in a state where the recording media 10 is loaded in the recording media unit 20-1 and the lower recording media unit 20-2 is in a state where the recording media 10 is not loaded in the recording media unit 20-2.

The recording media unit 20 generally includes a base member 100, a front member 110, the recording media holder 30, the connector 40, the recording media holder locking mechanism 50, the recording media holder moving mechanism 60, the shutter mechanism 70, an ejection mechanism 120 and a cover member 130.

As can be seen in FIGS. 2 and 4, the base member 100 is provided on the Z2-side of the recording media unit 20 and supports the front member 110, the locking mechanism 50, the holder moving mechanism 60, the shutter mechanism 70 and the ejection mechanism 120. As can be seen in FIG. 3, the base member 100 is provided with four leg parts 101 and receiving parts 102 on the Y2 side at both ends of the width-wise direction and on the Y1 side at both ends of the width-wise direction. The recording media unit 20 can be used alone or may be used in a stacked and coupled state. For example, as shown in FIGS. 2 and 5B, two recording media units 20-1 and 20-2 may be stacked and coupled with the leg parts 101 of the upper recording media unit 20-1 being secured to the receiving parts 102 of the lower recording media unit 20-2.

As can be seen in FIGS. 2, 5A and 5B, the cover member 130 is provided adjacent the front bezel 22 on the Y1-side of the front bezel 22 and its X1–X2 edges are secured to the base member 100 such that it covers the upper side of the recording media holder 30. A space 131 is formed between the cover member 130 and an upper surface 14 of the loaded recording media 10 so as to accommodate the first shutter 71 that is in an open and horizontal state.

As can be seen in FIG. 3, the front member 110 is secured on the Y2-side of the base member 100 and includes the front bezel 22 in which the slot 21 is formed and two arm parts 111 and 112 extending from both end parts of the slot 21 of the front bezel 22.

As can be seen in FIGS. 3 and 5B, the recording media accommodating holder 30 has a substantially rectangular shaped cross section with one end being open and has a dimension adapted to receive the recording media 10. The recording media holder 30 is supported by the arm parts 111 and 112 such that it surrounds the arm parts 111 and 112 and is movable in the Y1–Y2 direction while being guided by the arm parts 111 and 112. The recording media holder 30 holds the Y1-end of the inserted recording media 10. The connector 40 is attached on the Y1-end of the holder 30 such that it faces towards the Y2-direction. The connector 40 is provided with a further connector part 41 on its Y1-side. Contact terminals of the connector 40 extend up to the connector part 41. As shown in FIG. 3, a connector provided at the end of the flexible flat cable 80 is connected to the connector 41. The flexible flat cable 80 is guided through a hole 104 of a wall 103 that extends along the Z1–Z2 direction on the Y1 side of the base member 100.

As shown in FIG. 3, the recording media holder locking mechanism 50 includes a locking arm 52 that is pivotably supported by a shaft 51 on an upper surface of the recording media holder 30, a locking plate 53 that is attached to the base member 100, a locking pin 54 that is provided on the locking arm 52 and a torsion coil spring. Normally, the locking pin 54 is engaged to the locking plate 53 such that the recording media holder 30 is situated at position P2 and is locked so as not to move in the Y1-direction. Even if the recording media 10 is forced in, the position of the connector 40 is fixed and the connector 11 is positively connected to the connector 40. By inserting the recording media 10 up to a position where the connector 11 is connected to the connector 40, a front end surface 17 in the Y1-direction of the recording media 10 presses and pivots the locking arm 52. Then the locking pin 54 disengages from the locking plate 53 such that the locking mechanism 50 is unlocked. The recording media holder 30 and the connector 40 are pressed by the recording media 10 that is being inserted and are displaced in the Y1-direction.

The recording media holder moving mechanism 60 will described later.

As can be seen in FIG. 5B, the shutter mechanism 70 includes the first shutter 71 that closes the slot 21 while the recording media 10 is not accommodated and the second shutter 75 having shutter main body 77 that closes the slot 21 while the recording media 10 is accommodated.

As shown in FIG. 2, the ejection mechanism 120 includes a rod 121 that is supported on the X1-side of the base member 100 such that it is movable along the Y1–Y2 direction, an ejection button 122 that protrudes out of an opening 113 provided in the front bezel 22, an ejection lever 124 attached to a shaft member 123 that is secured on the Y1-end side of the base member 100 and an ejection pole 125 at the X2-direction end of the ejection lever 124. The Y1-end of the rod 121 is linked to the X1-end of the ejection lever 124. The ejection pole 125 opposes the Y1-direction end of the recording media holder 30. In a state where the recording media 10 is not loaded in the recording media unit 20, the ejection button 122 is retracted in the opening 113, which is clearly shown by the lower recording media unit 20-2. In a state where the recording media 10 is loaded in the recording media unit 20, the ejection button 122 protrudes from the opening 113, which is clearly shown by the upper recording media unit 20-1.

By pressing the ejection button 122, the ejection lever 124 is pivoted in an anticlockwise direction when viewed in a plan view. Then, the ejection pole 125 presses the recording media holder 30 to displace it in the Y2-direction.

In order to accommodate the recording media 10, the operator holds the recording media 10 and inserts it into the slot 21 in which an indication part 77a "NO MEDIA" is visible and forces it into the slot 21. As a result, the connector 11 is connected to the connector 40 and then the locking mechanism 50 is unlocked. Then, the recording media holder moving mechanism 60 operates such that the recording media 10 is pulled inside and accommodated as is shown in FIG. 5B for the case of the upper recording media unit 20-1.

In order to eject the recording media 10 after an information-writing operation, the operator presses the ejection button 122. With this operation, the ejection mechanism 120 operates and the recording media holder 30 is displaced along the Y2-direction. Then, the recording media holder moving mechanism 60 operates from a certain intermediate position such that the recording media holder 30 is displaced by the recording media holder moving mechanism 60 and the rear end part 12 of the recording media 10 protrudes from the slot 21 as can be seen in FIG. 3.

It is to be noted that, as shown in FIGS. 2 and 3, a slit 124a is formed in the ejection lever 124 and the ejection pole 125 is secured by screwing a screw from an upper side. Thus, the position of the ejection pole 125 is adjustable along the ejection lever 124. By adjusting the position of the ejection pole 125, the position of a working point where the ejection pole 125 presses the recording media holder 30 is adjusted. In other words, a length L2 of an arm described later is adjusted and finally a stroke that presses and operates the ejection button 122 for ejecting the recording media 10 is adjusted.

Now, the recording media holder moving mechanism 60 that is an essential part of the present invention will be described with reference to FIGS. 6A–6C, 7A, 7B, 8A, 8B, 9A and 9B.

Figure 6A:
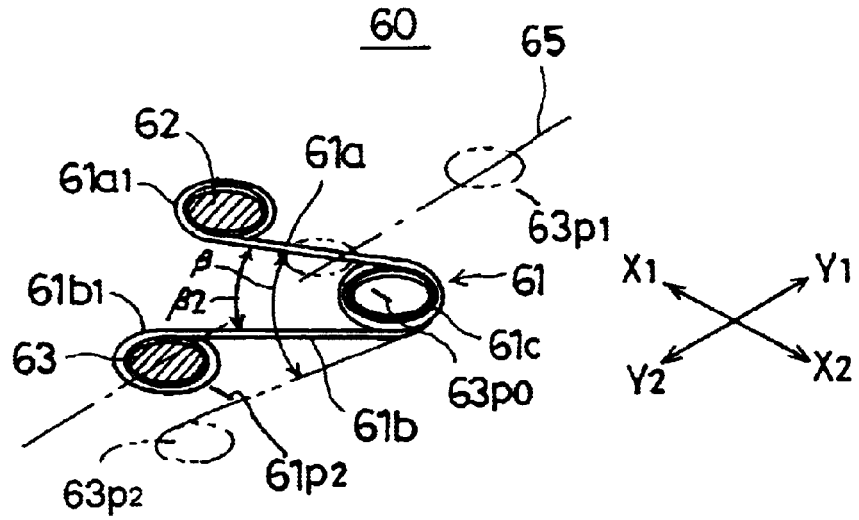
FIGS. 6A through 6C are enlarged diagrams of a recording media holder moving mechanism of the present invention.
Figure 6B:
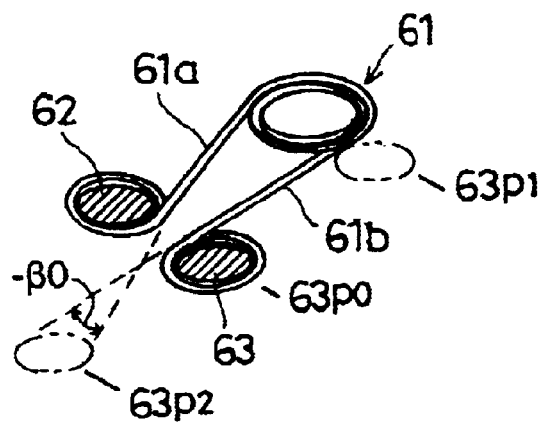
Figure 6C:
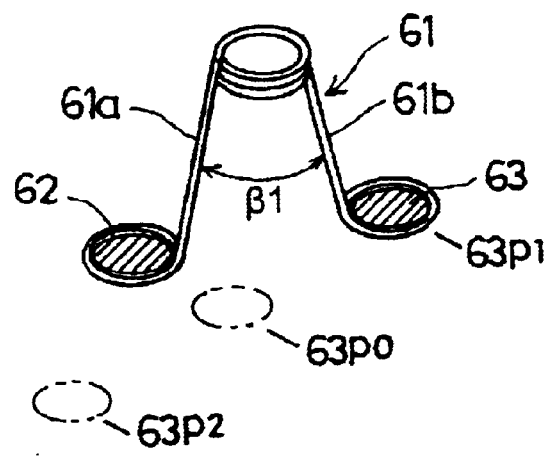
Figure 7A:
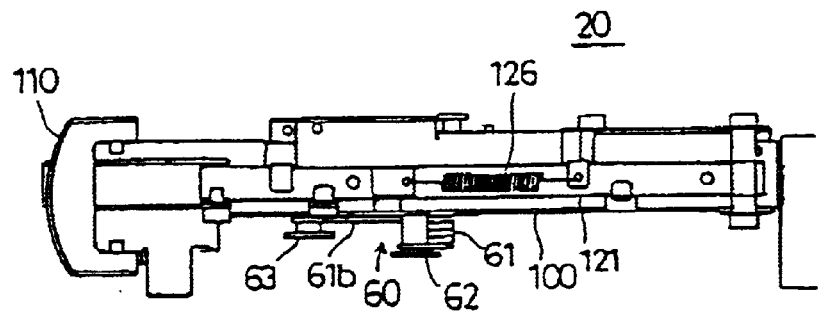
FIGS. 7A and 7B are diagrams showing the recording media unit mechanism of the present invention in a state before inserting a recording media.
Figure 7B:
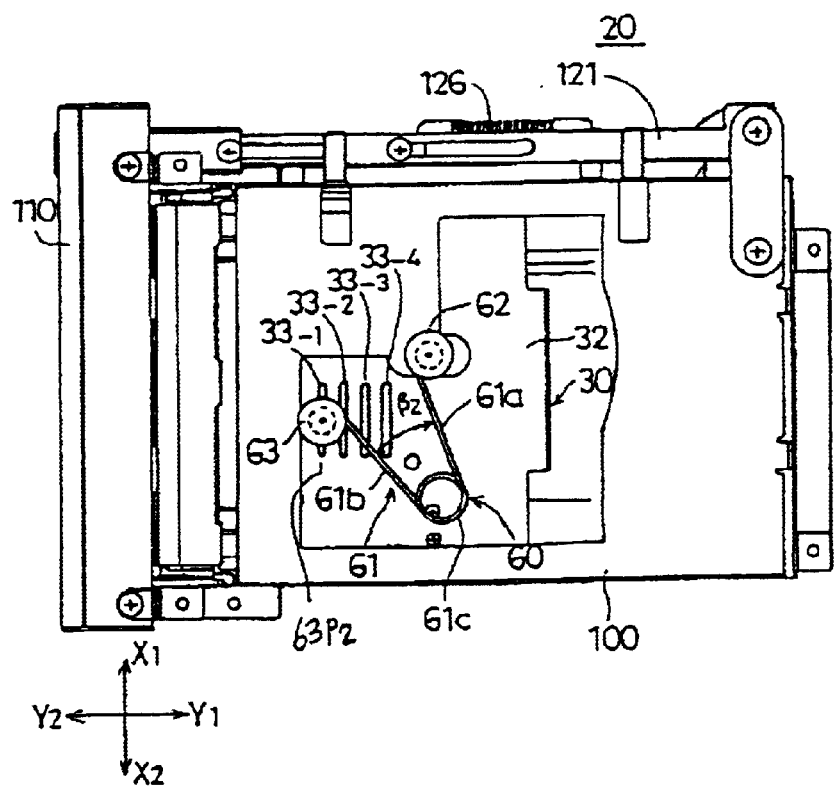
Figure 8A:
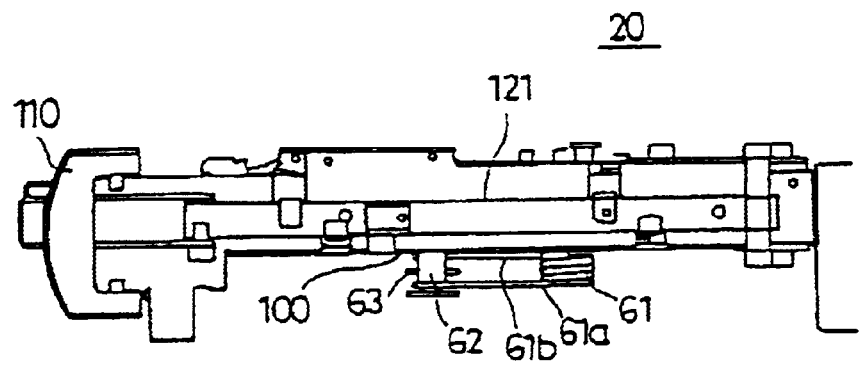
FIGS. 8A and 8B are diagrams showing the recording media unit mechanism of the present invention in a state during inserting a recording media.
Figure 8B:
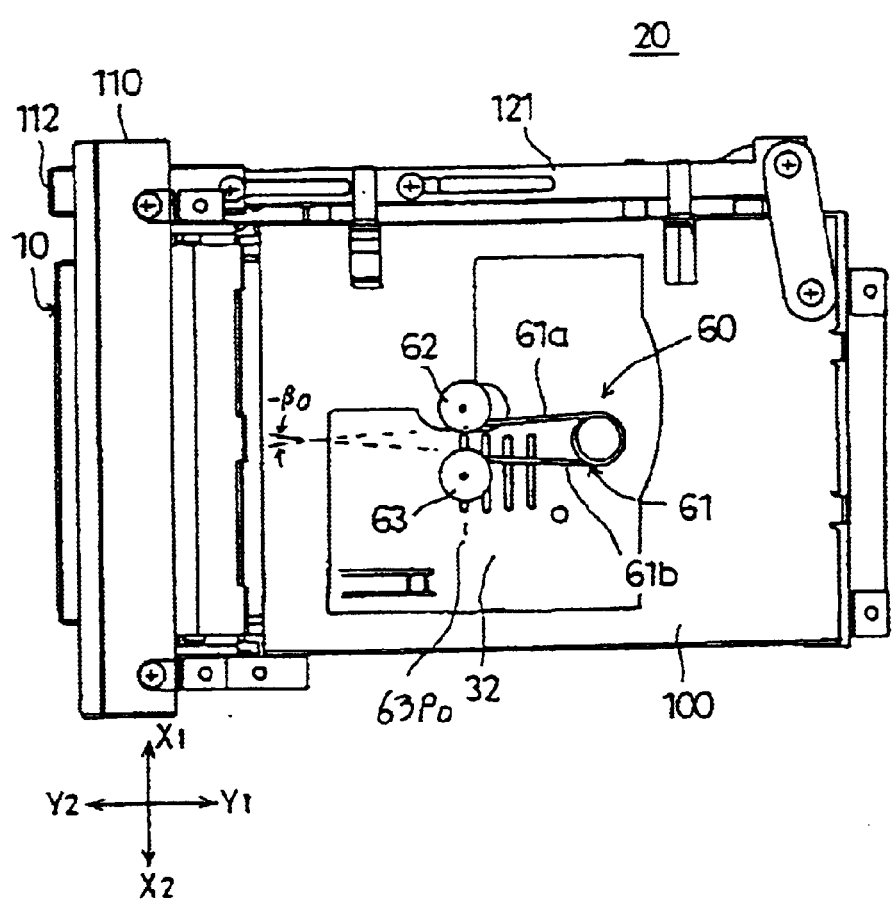
Figure 9A:
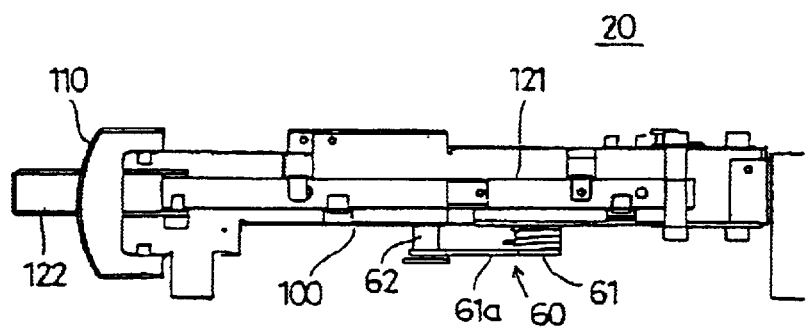
FIGS. 9A and 9B are diagrams showing the recording media unit mechanism of the present invention in a state where the recording media is accommodated.
Figure 9B:
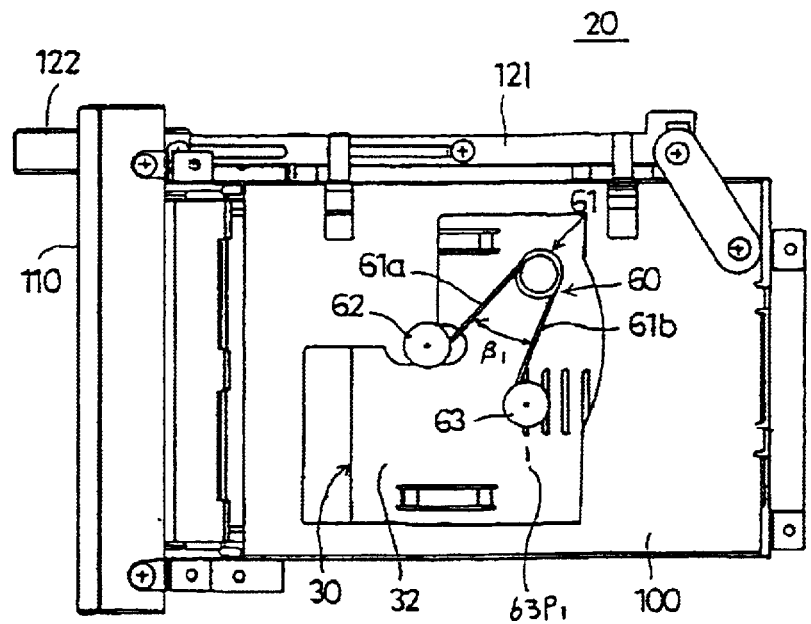

FIGS. 6A through 6C are diagrams showing a main part of the recording media holder moving mechanism 60. FIGS. 7A and 7B are diagrams showing the recording media unit 20 in a state before inserting the recording media 10 and the recording media holder moving mechanism 60 is in a state shown in FIG. 6A. FIGS. 8A and 8B are diagrams showing the recording media unit 20 in a state during inserting the recording media 10 and the recording media holder moving mechanism 60 is in a state shown in FIG. 6B. FIGS. 9A and 9B are diagrams showing the recording media unit 20 in a state where the recording media 10 is accommodated and the recording media holder moving mechanism 60 is in a state shown in FIG. 6C.

As can be seen in FIG. 6A, the recording media holder moving mechanism 60 makes use of a torsion coil spring 61 serving as a so-called reverse spring. The torsion coil spring 61 has a coil part 61c and two arm parts 61a and 61b that extend from the coil part 61c. Ring parts 61a1 and 61b1 are formed at ends of the arm parts 61a and 61b, respectively. Under a free state, the torsion coil spring 61 is in a state shown by a double-dash line and an angle between the arm parts 61a and 61b is β.

Figure 10:
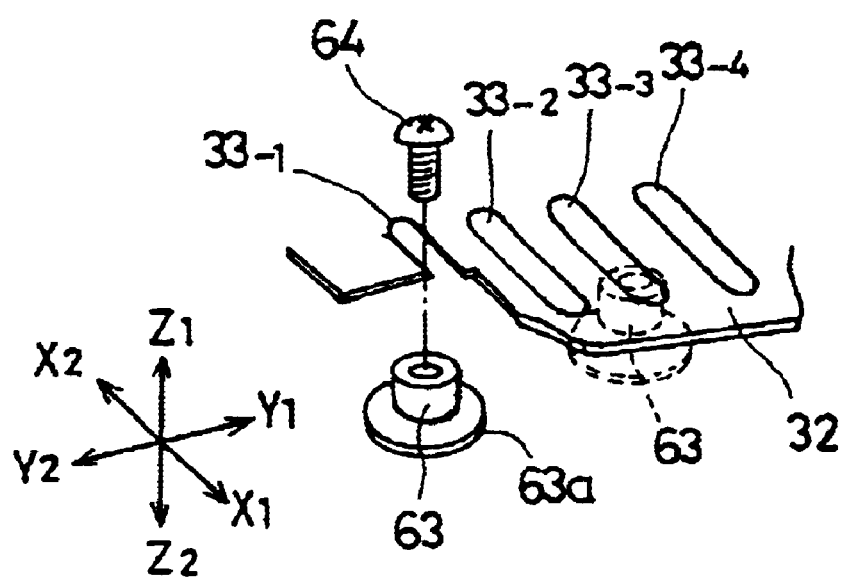
FIG. 10 is a diagram showing how a pole is attached to a bottom plate of the recording media holder.

As can be seen in FIGS. 7A and 7B, a flanged cylindrical pole 62 having a flange part 62a fixed on the bottom surface of the base member 100 by means of a screw. A flanged cylindrical pole 63 having a flange part 63a is fixed on the bottom surface of the bottom plate part 32 of the recording media holder 30. As can be seen in FIG. 10, four slits 33-1 through 33-4 are formed in the bottom plate part 32. The flanged cylindrical pole 63 is fixed by a screw 64 that penetrates through one of the slits, in this example, the slit 33-1, from the upper side of the base plate part 32. The torsion coil spring 61 is provided such that the ring part 61a1 is fitted on the pole that serves as a supporting point and a fixed point and the ring part 61b1 is fitted on the pole 62 that serves as a working point. The flange parts 62a and 63a prevents the torsion coil spring 61 from falling off. The poles 62 and 63 have sufficient strengths and the torsion coil spring 61 is securely attached. Further, the recording media holder moving mechanism 60 has a sufficient mechanical strength and has sufficient shock resistance strength.

As can be seen in FIG. 6A, the pole 63 moves together with the recording media holder 30 along line 65 in the Y1–Y2 direction and passes by the pole 62. Reference numeral 63P2 represents a position of the pole 63 when the recording media holder 30 is at position P2 in FIG. 1. Reference numeral 63P0 represents a position of the pole 63 when the recording media holder 30 is at potion P0. Position 63P0 is on the X2-side of the pole 62. Reference numeral 63P1 represents a position of the pole 63 when the recording media holder 30 is at P1.

When the recording media unit 20 is in the state shown in FIGS. 7A and 7B, the torsion coil spring 61 is in the state shown in FIG. 6A. Angle β2 between the arm parts 61a and 61b are smaller than the above-mentioned angle β. The torsion coil spring 61 produces a spring force that tends to widen the angle between the arm parts 61a and 61b. In this state, this spring force is exerted on the pole 63 and the recording media holder 30 is at position P2 and is biased in the Y2-direction. The torsion coil spring 61 is oriented such that the coil part 61c is situated in a direction between X2 and Y1 when viewed from the position of the pole 62. Also, the recording media holder 30 is kept at position P2 by the spring force of the torsion coil spring 61.

When the operator inserts and pushes the recording media 10 into the slot 21, the connector 11 will be connected to the connector 40 that is a counterpart of the connector 11. Thereafter, the recording media 10 pushes the recording media holder 30 and the recording media holder 30 starts moving in the Y1-direction.

When the recording media holder 30 is further pushed and starts moving, the angle β2 between the arm parts 61a and 61b will be narrowed. Then, a spring force is built up in the torsion coil spring 61 and the torsion coil spring 61 is pivoted about the pole 62 in an anticlockwise direction in FIGS. 6A and 7B. The recording media holder 30 is moved against the spring force of the torsion coil spring 61. Here, even though a spring force is built up in the torsion coil spring 61, the torsion coil spring 61 changes its orientation by being pivoted in an anticlockwise direction and the Y2-direction component of the above-mentioned spring force is reduced. Therefore, the operator does not feel that the pressing operation has an increased resistance and the recording media 10 can be smoothly pressed in.

When the recording media holder 30 reaches position P0 and the pole 63 reaches position 63P0, the torsion coil spring 61 comes to a state shown in FIGS. 6B and 8B. The angle between the arm parts 61a and 61b narrows to an angle beyond zero degrees where the arm parts 61a and 61b are parallel to each other and becomes negative. In the narrowest state, the angle between the arm parts 61a and 61b is −β0 and the torsion coil spring 61 will be oriented such that the coil part 61 is situated in the Y1-direction when viewed from the pole 62.

When the recording media holder 30 is further moved to a position beyond position P0, the torsion coil spring 61 will be oriented such that the coil part 61c is situated at a position toward the X1-direction and the Y1-component starts to appear in the spring force of the torsion coil spring 61 that is exerted on the pole 63. As the recording media holder 30 further moves beyond position P0, the torsion coil spring 61 is pivoted in an anticlockwise direction in the figure. Accordingly, the torsion coil spring 61 will be oriented such that the coil part 61c is further moved toward the X1-direction and the Y1-direction component of the spring force of the torsion coil spring 61 that is exerted on the pole 63 increases.

Therefore, even without pressing the recording media 10, the recording media holder 30 starts moving in the Y2-direction by the spring force of the torsion coil spring 61, presses the ejection pole 125 and, the ejection lever 124 is quickly moved to position P1 in which it becomes substantially parallel to the X1–X2 line shown in FIG. 2. The torsion coil spring 61 comes to a state shown in FIG. 6C in which it is oriented in a direction between X1 and Y1 when viewed by taking the position of the pole 62 as a reference. The angle between the arm parts 61a and 61b becomes β1. The recording media holder 30 is kept at position P1 by the spring force of the torsion coil spring 61.

That is to say, the recording media holder 30 is first moved in the Y1-direction by a pressing operation of the recording media 10 that is performed by the operator. Then, from a certain intermediate position, the recording media holder moving mechanism 60 moves the recording media holder 30, so that the recording media 10 is pulled inside the recording media unit 20. In this manner, the recording media 10 is loaded and accommodated in the recording media unit 20, and the recording media unit 20 comes to a state shown in FIGS. 9A and 9B. In this state, an information writing operation may be performed for the recording media 10.

When the operator presses the ejection button 122 to eject the recording media 10 after the information writing operation, the ejection mechanism 120 shown in FIG. 2 operates and the ejection lever 124 is pivoted about the shaft member 123 in an anticlockwise direction in the figure. Then, the ejection pole 125 pushes the recording media holder 30 in the Y2-direction.

When the recording media holder 30 is pushed and starts moving, the torsion coil spring 61 and associated parts operate in a reversed order of the above-mentioned operation of inserting and loading the recording media 10. That is to say, the torsion coil spring 61 and associated parts operate in such manner they start from the state shown in FIG. 6C, change to the state shown in FIG. 6B and finally reaches the state shown in FIG. 6A.

First, the torsion coil spring 61 operates such that the angle β1 between the arm part 61a and the arm part 61b is narrowed and the torsion coil spring 61 is pivoted about the pole 62 in a clockwise direction in FIGS. 6c and 9B. The recording media holder 30 is moved against the spring force of the torsion coil spring 61.

When the recording media holder 30 reaches position P0 and the pole 63 reaches position 63P0, the torsion coils spring 61 comes to a state shown in FIGS. 6B and 8B. The angle between the arm part 61a and the arm part 61b becomes narrowest, i.e., −β0. Also, the torsion coil spring 61 will be oriented such that the coil part 61c is situated in the Y1-direction when viewed from the pole 62.

As the recording media holder 30 moves beyond position P0, the torsion coil spring 61 becomes oriented in such a manner that the coil part 61c is situated in the X2-direction when viewed from the pole 62 and a Y2-direction component appears in the spring force of the torsion coil spring 61 exerted on the pole 63. As the recording media holder 30 is further moved beyond position P0, the torsion coil spring 61 is pivoted in the clockwise direction in the figure and further oriented such that the coil part 61c is situated in the X2-direction when viewed from the pole 62. Accordingly, the Y2-direction component of the spring force of the torsion coil spring 61 exerted on the pole 63 increases.

Therefore, even if the operator does not further push in the ejection button 122, the recording media holder 30 starts moving in the Y2-direction due to the spring force of the torsion coil spring 61 and is quickly moved to the original position P2 where it abuts a stopper. The pole 63 reaches position 63P2. The torsion coil spring 61 comes to a state shown in FIG. 6A where the coil part 61C is situated in a direction between X2 and Y1 when viewed from the pole 62 and the angle between the arm parts 61a and 61b becomes β2. The recording media holder 30 is kept in position P2 by the spring force of the torsion coil spring 61.

That is to say, the recording media holder 30 is first moved in the Y2-direction by when the operator presses the ejection button 122. Then, from a certain intermediate position, the recording media holder moving mechanism 60 moves the recording media holder 30, so that the recording media 10 protrudes from the slot 21 such that its rear end part 12 protruded as shown in FIG. 3. The operator can hold the recording media 10 at the rear end part 12.

Therefore, during an ejection operation, the operator only needs to press the ejection button 122 up to a position where the recording media holder moving mechanism 60 starts operating. Therefore, since the ejection button 122 can be operated with a short push-in stroke, operability is improved. Also, when the operator releases the ejection button 122, the ejection mechanism 120 returns to its original state by means of a coil spring 126 and the ejection button 122 will protrude from the front bezel 22 in the Y2-direction.

Now, the ejection mechanism 120 of FIG. 2 is considered. Length L1 of the arm between the shaft member 123, or the center of rotation of the ejection lever 124, and the rod 121 is shorter than length L2 of the arm between the shaft member 123 and the ejection pole 125. Therefore, when the rod 121 is moved through distance "A" in the Y1-direction, the ejection pole 125 moves in the Y1-direction through distance "B" that is L2/L1 times the distance "A".

With such a structure, the push-in stroke of the ejection button 122 may become even shorter and therefore further improved operability can be achieved.

Also, since the ring part 61a1 of the torsion coil spring 61 is loosely fit on the cylindrical pole 62 and the ring part 61b1 is loosely fit on the cylindrical pole 63, the torsion coil spring 61 smoothly changes its orientation in an unresisting manner. Therefore, the recording media holder moving mechanism 60 operates smoothly.

As shown in FIG. 10, the position of the pole 63 on the lower surface of the bottom plate part 32 of the recording media holder 30 may be changed along the Y1–Y2 direction by selecting one of the slits of the four slits 33-1 through 33-4 and may also be changed along the X1–X2 direction by selecting the longitudinal position along the slit.

By changing the fixing position of the pole 63, the working point of the torsion coil spring 61 is altered. Thus, the position of the recording holder 30 where the direction of the spring force of the torsion coils spring 61 exerting on the recording media holder 30 changes, that is to say, the position of the recording media holder 30 from which the recording media holder 30 that has been moved is further moved in the same direction, and the force exerted by the torsion coil spring 61 on the recording media holder 30 are adjusted.

Since the position of the recording holder 30 where the direction of the spring force of the torsion coils spring 61 exerting on the recording media holder 30 changes can be adjusted, the final position to be reached by recording media 10 due to a pushing operation by the operator is adjusted and also the stroke of the ejection button 122 that the operator should push in during an ejection operation is adjusted.

Alternatively, the torsion coil spring 61 may be provided with bent parts at end parts of the arm parts, respectively, such that the bent part fits in a hole formed in the base member 100 and a hole formed in the base plate part 32 of the recording media holder 30.

Also, instead of the torsion coil spring 61, a torsion spring having a V-shaped cross section with ring parts provided on respective end parts may be used.

Further, the present invention is not limited to these embodiments, and variations and modifications may be made without departing from the scope of the present invention.

The present application is based on Japanese priority application No. 2001-373262 filed on Dec. 6, 2001, the entire contents of which are hereby incorporated by reference.

What is claimed is:

1. A recording media unit comprising:
    a slot through which a recording media is inserted into and accommodated inside the recording media unit;
    a recording media holder, movably attached inside the recording media unit, for supporting the recording media; and
    a recording media moving mechanism, connected to the recording media holder, having a spring member,
    wherein said recording media holder that supports said recording media that has been inserted through said slot and has been moved to an intermediate position along a direction in which said recording media is inserted is moved by a spring force of said spring member to a position where said recording media is pulled inside said recording media unit,
    wherein said spring member is a torsion coil spring having a supporting point and a movable working point such that the direction of spring force is reversed with respect to said supporting point after passing a point where said supporting point and said working point are aligned along a direction perpendicular to the direction of insertion of said recording media.

2. The recording media unit as claimed in claim 1, wherein said spring member is provided in such a manner that its fixing position can be changed.

3. A recording media unit comprising:

a slot through which a recording media that is accommodated inside said recording media unit is ejected out of the recording media unit by an ejection operation;

a recording media holder, movably attached inside the recording media unit, for supporting a recording media; and a recording media holding mechanism, connected to the recording media holder, having a spring member, wherein said recording media holder that supports said recording media and has been moved to an intermediate position along a direction in which said recording media is inserted is moved by a spring force of said spring member to a position where said recording media protrudes from said slot, wherein said spring member is a torsion coil spring having a supporting point and a movable working point such that the direction of spring force is reversed with respect to said supporting point after passing a point where said supporting point and said working point are aligned along a direction perpendicular to the direction of insertion of said recording media.

4. The recording media unit as claimed in claim 3, wherein said spring member is provided in such a manner that its fixing position can be changed.

5. The recording media unit as claimed in claim 3, further comprising an ejection mechanism in which a pivotable lever that is pivoted when a button is pressed during an ejection operation and that pushes and moves said recording media holder towards said slot is configured such that a length of an arm between the pivotal center and the position where the force for ejection operation is exerted is shorter than a length of the arm between the pivotal center to the position where the recording media holder is pushed.

6. A recording media unit comprising:

a slot through which a recording media is inserted into and ejected out of the recording media unit;

a recording media holder, movably attached inside the recording media unit, for supporting a recording media; and a recording media holding mechanism, connected to the recording media holder, having a spring member, wherein said recording media holder that supports said recording media that has been moved to an intermediate position along a direction in which said recording media is inserted is moved bya spring force of said spring member to a position where said recording media protrudes from said slot, wherein said spring member is a torsion coil spring having a supporting point and a movable working point such that the direction of spring force is reversed with respect to said supporting point after passing a point where said supporting point and said working point are aligned along a direction perpendicular to the direction of insertion of said recording media.

7. The recording media unit as claimed in claim 6, wherein said spring member is provided in such a manner that its fixing position can be changed.

8. The recording media unit as claimed in claim 6, further comprising an ejection mechanism in which a pivotable lever that is pivoted when a button is pressed during an ejection operation and that pushes and moves said recording media holder towards said slot is configured such that a length of an arm between the pivotal center and the position where the force for ejection operation is exerted is shorter than a length of the arm between the pivotal center to the position where the recording media holder is pushed.

* * * * *